United States Patent [19]

Proctor et al.

[11] Patent Number: 5,790,552
[45] Date of Patent: Aug. 4, 1998

[54] STATISTICAL GAIN USING ATM SIGNALLING

[75] Inventors: Richard John Proctor; Michael Denis Batts; Mark Timothy Jeffrey, all of Dorset, United Kingdom

[73] Assignee: GPT Limited, Coventry, United Kingdom

[21] Appl. No.: 410,928

[22] Filed: Mar. 27, 1995

Related U.S. Application Data

[63] Continuation of Ser. No. 210,665, Mar. 18, 1994, abandoned.

[30] Foreign Application Priority Data

Mar. 26, 1993 [GB] United Kingdom ............... 9306367

[51] Int. Cl.[6] .................................................. H04J 3/16
[52] U.S. Cl. .................................. 370/466; 370/522

[58] Field of Search ............................ 370/60.1, 94.2, 370/79, 82, 83, 84, 110.1, 60, 99, 395, 465, 466, 469, 470, 471, 473, 474, 490, 489, 394, 522, 524

[56] References Cited

U.S. PATENT DOCUMENTS 5,345,445  9/1994  Hiller et al. .................. 370/60.1

*Primary Examiner*—Chau Nguyen
*Attorney, Agent, or Firm*—Kirschstein et al.

[57] ABSTRACT

Statistical multiplexing gain is desirable on ATM links, especially on high-cost international links, and is provided where STM traffic is carried as cells on an ATM bearer. The cells have a bit-stream based AAL format including a map for indicating any STM idle channels. The STM idle channels are not transmitted in the cells. Preferably, the format is AAL Type 1 for structured data, and the map is carried using an extension mechanism of that format.

9 Claims, 3 Drawing Sheets

SN = SEQUENCE NUMBER
SNP = SEQUENCE NUMBER PROTECTION
CSI = CONVERGENCE SUBLAYER INDICATOR
SAR = SEGMENTATION AND REASSEMBLY LAYER
PDU = PROTOCOL DATA UNIT

POINTER = EXTENSION OF CSI INFORMATION
RES. = RESERVED FOR FUTURE USE, STANDARDIZED VALUE IS ZERO
OFFSET = POINTS TO START OF THE FIRST FRAME OF DATA AFTER THE POINTER, UP TO TWO CELLS AHEAD IN THE PAYLOAD

Fig.5.

| HEADER | S N & S N P | B P T R | BUSY BIT MAP (19 TIMESLOTS BUSY) | 7 TIMESLOTS OF PREVIOUS FRAME CONTROLLED BY PREVIOUS BUSY MAP ↑ | FRAME OF 19 BUSY TIMESLOTS | START OF FRAME OF 19 TIMESLOTS. 15 TIMESLOTS IN THIS CELL |

| HEADER | S N & S N P | REMAINING 4 TIMESLOTS OF FRAME | FRAME OF 19 BUSY TIMESLOTS | START OF FRAME OF 19 TIMESLOTS. 5 TIMESLOTS IN THIS CELL |

| HEADER | S N & S N P | B P T R | BUSY BIT MAP (17 TIMESLOTS BUSY) | 14 TIMESLOTS OF PREVIOUS FRAME CONTROLLED BY PREVIOUS BUSY MAP ↑ | FRAME OF 17 BUSY TIMESLOTS | START OF FRAME OF 17 TIMESLOTS. 10 TIMESLOTS IN THIS CELL |

| HEADER | S N & S N P | REMAINING 7 TIMESLOTS OF FRAME | FRAME OF 17 BUSY TIMESLOTS | START OF FRAME OF 17 TIMESLOTS. 6 TIMESLOTS IN THIS CELL |

STATISTICAL GAIN USING ATM SIGNALLING

This is a continuation of application Ser. No. 08/210,665, filed Mar. 18, 1994, abandoned.

BACKGROUND OF THE INVENTION

Field of the Invention

A way is described by which a telecommunications system cross-connect can be enhanced to provide statistical gain on telephony and other constant bit-rate traffic over high cost international links.

An interest has been expressed in the use of Asynchronous Transfer Mode (ATM) as a means to obtain statistical gain in an existing network, particularly on the high-cost international links.

The concern is with savings for the transmission of Synchronous traffic, not ATM services, so the problem must be addressed in the way the Synchronous Transfer Mode (STM) service is mapped onto the ATM bearer.

It has been suggested that the frame mapping from a 2M connection on to the ATM cell stream could be adjusted to leave out idle channels, by examining the signalling channel to determine which channels are in use.

This suggestion does not work as, while a Digital Signalling System 1 (DSS1) system does use channel 16 of the Pulse Code Modulation (PCM) structure for signalling, the same assumption does not apply to Signalling System 7 (SS7) that may even be running on a different transmission bearer, DSS1 and SS7 being CCITT standards.

SUMMARY OF THE INVENTION

According to the present invention there is provided a method of providing statistical gain where Synchronous Transfer Mode (STM) traffic is carried as cells on an Asynchronous Transfer Mode (ATM) bearer the cells having a bit-stream based ATM Adaptation Layer (AAL) format including a map indicating any STM idle channels, the idle channels not being transmitted in the cells.

BRIEF DESCRIPTION OF THE DRAWINGS

The present invention will now be described, by way of example, with reference to the accompanying drawings, in which:

FIG. 5 schematically depicts a typical example of the distribution of timeslots within a series of cells.

DETAILED DESCRIPTION OF THE INVENTION

It is possible to identify idle channels from the data bytes they contain. There is a defined idle pattern. Therefore it would be possible to omit these channels from the pattern passed to the ATM network. To do this it is necessary to include some information in-band to identify which channels are present at any one time. There are a number of ways to do this.

(i) Busy-Map field per 2M bit/s frame.

A 4-octet field can be included at the front of each 2M frame. This will have a 1 bit marker for each of the 32 timeslots of the bearer. If the bit is set, this indicates that the corresponding channel is present in this frame. The length of the frame can be calculated by adding the busy bits together, and the bytes can then be sorted out again based on the busy pattern.

This method incurs an overhead of 4 octets per frame. There is a saving whenever there are less than 26 timeslots in use, but more than these make it less efficient.

(ii) Busy-Map field per cell.

Alternatively the busy bits per cell could be included, which would reduce the overhead quite a lot. The busy bits will apply to all the frames that start after the beginning of the cell, not to the one already being processed. This has the advantage of being easy to locate in the receiver, and having far less overhead than per frame. Changes cannot be applied in every frame, but this is not a big loss.

(iii) Busy-Map as an extension of ATM Adaptation Layer (AAL) Type 1.

It is also possible, and probably the best option of the lot, to use the existing AAL Type 1 format for structured data, using the extension mechanism to carry the Busy Map. This would involve an overhead of 4 octets (for a 32 channel PCM) only when required to change the configuration. This method is explained below.

Figure 1:
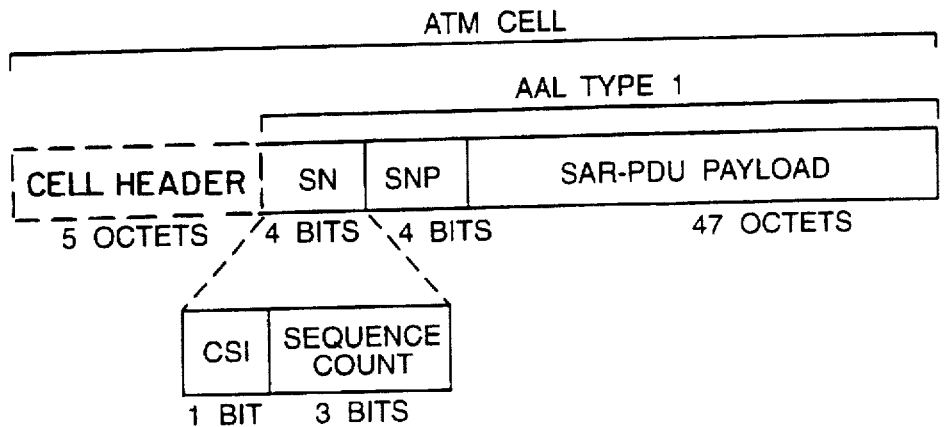
FIG. 1 is a diagrammatic representation of an Asynchronous Transfer Mode (ATM) cell using the basic ATM Adaptation Layer Type 1 (AAL1) format according to the prior art.
Figure 2:
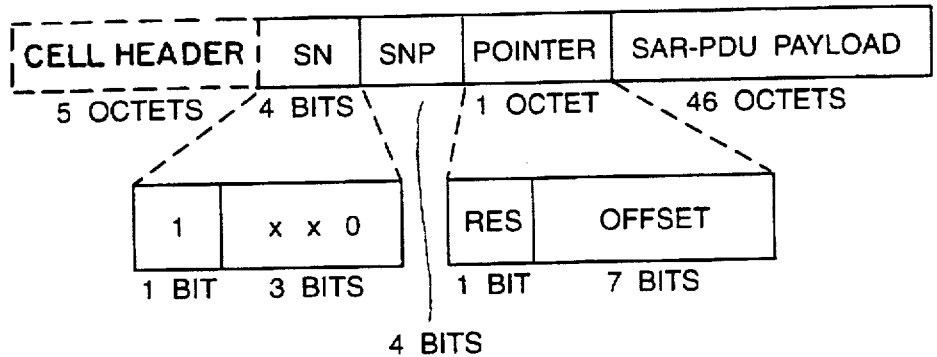
FIG. 2 is a diagrammatic representation of a cell similar to that in FIG. 1, but showing the use of further AAL1 octets according to the prior art.

The AAL Type 1 format is currently as shown in FIG. 1. The Sequence Count is a binary counter that free-runs over the duration of the connection. The whole of the Sequence Number (SN) field is protected by the Sequence Number Protection (SNP). The use of the Convergence Sublayer Indicator (CSI) bit depends on the sequence count. When the sequence count is odd, the CSI bit is used to carry a four-bit value over eight cells of data which is used for a Synchronous Residual Time Stamp. When the sequence count is even, the CSI bit indicates the presence of a further octet or octets of AAL Type 1. FIG. 2 shows how this is achieved.

The data to be transferred, Pulse Code Modulation (PCM) frames, is structured and synchronous. The first bit within the Pointer octet is a Reserved Bit, which is set to 1 in this case.

Figure 3:
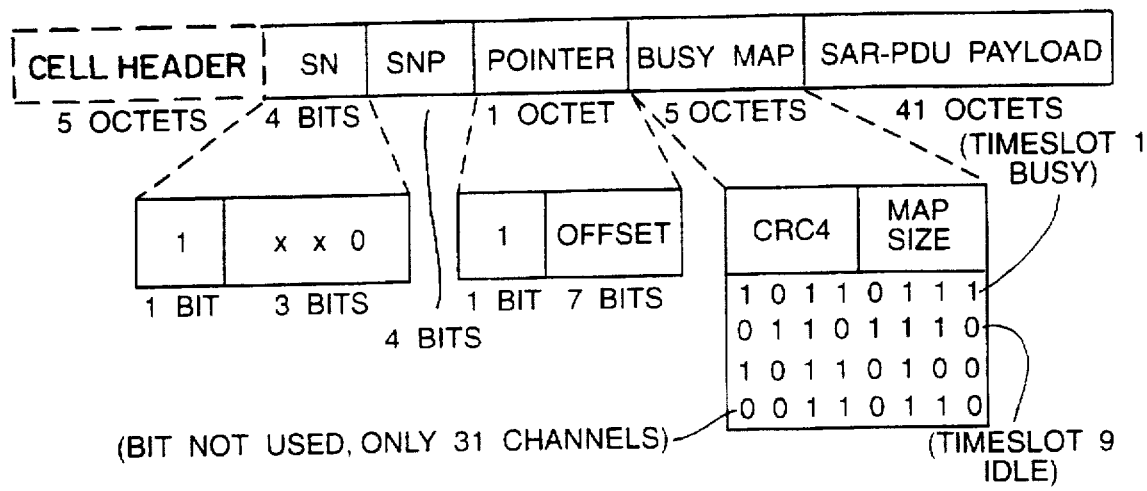
FIG. 3 is a diagrammatic representation showing the introduction of a busy-map into the AAL1 format.

Referring now to FIG. 3, the existence of a Reserved Bit set to 1 indicates the presence of a number of further octets, which octets indicate the busy state of the PCM channels.

The number of octets required is defined by the nature of the connection being carried and is predetermined at connection setup.

For this example, the case of a 32 channel PCM structure, such as European Telecommunications Standards Institute (ETSI) Standard E1, where 31 channels are available for user data is considered. This corresponds to Integrated Services Digital Network (ISDN) (Narrowband).

The busy-map refers to all the data following the frame pointed to by the Offset Pointer. Data before this point will still be controlled by the previous busy-map.

If the Reserved Bit is zero, then the busy-map will not be present and the receiver will assume the previous busy-map remains in force. The sender can stop sending the busy-map after a number of repeated identical busy-maps, at his discretion. It may well be wise to send even this identical busy-map from time to time to increase reliability. If the whole link becomes idle, the data flow could cease altogether after a number of repeated all idle frames, though a slow confirmation should be sent at a low data rate for confidence checks.

The Map Size is the length of the busy-map in octets. The Map Size allows the size of the data stream to be changed without affecting the existing traffic. The Cyclic Redundancy Check (CRC4) protects the pointer and the whole of busy bit map.

The presence of a '1' in the busy-map indicator a busy timeslot and a '0' an idle timeslot. The timeslots increase from right to left in the top row, then through succeeding rows. The left-hand bottom bit in the table will not be used as there are only 31 data channels.

A similar approach could be used to encode the "repeat" state of a channel, the map in this case referring not to idle channels but to instances where the pattern is the same as that already carried on that channel.

Similarly, channels could be checked for audio content and so channels could be omitted on that basis. However, care would need to be exercised to avoid accidental corruption of data channels in this case.

To see far enough ahead to build the busy map, it would be necessary to have a look-ahead of two cells of outgoing information. This will involve some delay while the cells are stored before compression. The size of the delay will depend on the number of 2M frames that can be fitted in, which in turn depends on the number of busy channels. It will probably be desirable to send some idle information channels when very few channels are in use to prevent the bandwidth dropping too low and hence the delay rising to unacceptable levels. The actual implementation of this will depend on user requirements.

If a cell containing the busy-map is lost, the following cell will probably have to be discarded. The damage will extend from the lost cell through to the frame beginning after the next busy-map.

Figure 4:
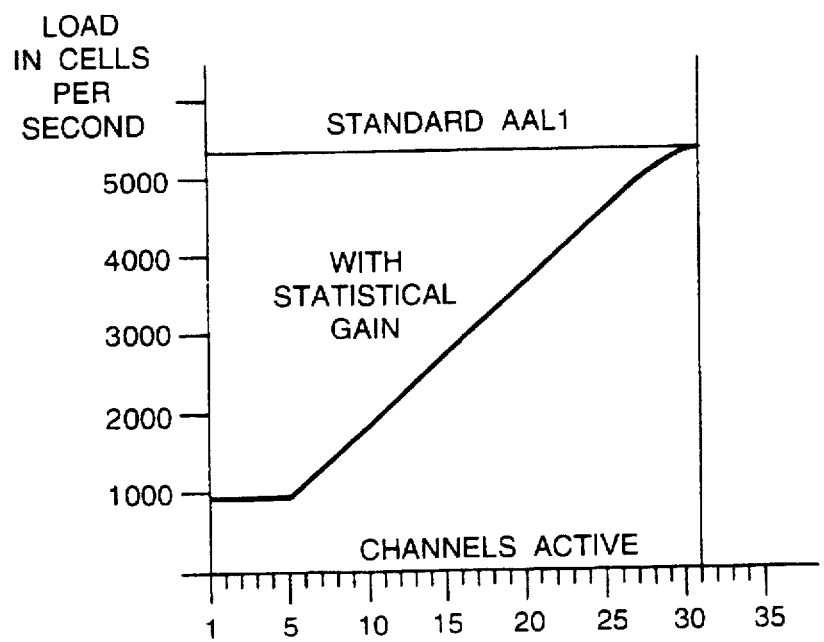
FIG. 4 shows graphically the performance resulting from the use of the present invention.

FIG. 4 shows graphically the load on a channel that is carrying a 2M PCM. The dashed line is the load using the standard AAL 1, while the solid line is the load using the invention. The graph shows the effect of sending a minimum of five channels to maintain a minimum bandwidth.

The invention can be extended to Data Channel Compression for modem data and lower rate ISDN data including transcoding. Further, operation of a larger number of 2M streams would maintain a low delay.

In FIG. 5 is shown a sequence of four cells where timeslots are distributed amongst the cells in accordance with the present invention.

There are initially 19 busy timeslots, followed by 17 busy timeslots. In each case where a new sequence of busy timeslots occurs at the beginning of the cell there is a busy bit map preceded by a point (PTR). This pointer to the beginning of the frame in the cell where the new group of timeslots starts as indicated by the arrow extending from PTR.

What we claim is:

1. A method of providing statistical multiplexing gain in a telecommunications system arranged for carrying Synchronous Transfer Mode (STM) traffic on an Asynchronous Transfer Mode (ATM) bearer to a destination, the STM traffic having channels some of which channels are idle channels, the STM traffic less at least a majority of the idle channels being transmitted as cells on the ATM bearer, said cells having a bitstream-based ATM Adaptation Layer (AAL) format, said method comprising the step of including with said AAL format a map for indicating any idle channels not transmitted to enable the STM traffic to be reconstituted at the destination.

2. The method according to claim 1, wherein the format is an AAL Type 1 format having an extension bit whose value is set to indicate the presence of additional data, and further comprising the step of carrying the map by setting the extension bit.

3. The method according to claim 2, wherein the format has a pointer reserved bit, and further comprising the step of indicating the presence of the map by setting the value of the pointer reserved bit.

4. The method according to claim 1, and further comprising the step of transmitting a predetermined minimum number of channels, including a minority of the STM idle channels.

5. The method according to claim 1, and further comprising the step of only periodically transmitting the map when an identical map is repeated a number of times in succession.

6. The method according to claim 1, and further comprising the step of determining a repeating pattern on at least one of the channels in the map, and the step of not transmitting the repeating pattern in the cells.

7. The method according to claim 1, and farther comprising the step of determining no audio content in audio channels on the map, and the step of not transmitting the audio channels in the cells.

8. The method according to claim 1, wherein the format includes a sequence number, a sequence number protection, and a payload having a segmentation and reassembly layer and a protocol data unit.

9. The method according to claim 8, wherein the sequence number includes a convergence sublayer indicator and a sequence count.

* * * * *